(12) United States Patent
Parrott et al.

(10) Patent No.: US 6,618,580 B2
(45) Date of Patent: Sep. 9, 2003

(54) APPARATUS AND METHOD FOR REMOTELY POWERING-DOWN A WIRELESS TRANSCEIVER

(75) Inventors: William M. Parrott, Thousand Oaks, CA (US); Ian Seacombe, Reseda, CA (US)

(73) Assignee: Intel Corporation, Santa Clara, CA (US)

(*) Notice: Subject to any disclaimer, the term of this patent is extended or adjusted under 35 U.S.C. 154(b) by 0 days.

(21) Appl. No.: 09/781,601

(22) Filed: Feb. 12, 2001

(65) Prior Publication Data

US 2002/0062197 A1 May 23, 2002

Related U.S. Application Data

(60) Provisional application No. 60/182,161, filed on Feb. 14, 2000.

(51) Int. Cl.⁷ .................................................. H04B 1/16
(52) U.S. Cl. ..................... 455/343; 455/574; 455/92; 340/7.36; 340/7.33; 713/320; 713/324
(58) Field of Search ................................. 455/574, 343, 455/92, 140, 151.1, 151.2, 41; 340/7.36, 7.37, 7.32, 7.33; 713/310, 320, 324, 330

(56) References Cited

U.S. PATENT DOCUMENTS

| | | | |
|---|---|---|---|
| 4,775,928 A | * 10/1988 | Kendall et al. ............. 713/310 |
| 5,396,636 A | 3/1995 | Gallagher et al. ........... 395/750 |
| 5,406,261 A | * 4/1995 | Glenn ......................... 340/571 |
| 5,654,593 A | 8/1997 | Murata ......................... 307/86 |
| 5,731,763 A | 3/1998 | Herweck et al. ............ 340/7.36 |
| 5,767,844 A | 6/1998 | Stoye ........................... 345/212 |
| 5,812,085 A | 9/1998 | Barraza et al. .............. 341/176 |
| 5,815,407 A | 9/1998 | Huffman et al. ............. 364/492 |
| 5,856,789 A | 1/1999 | Huang ......................... 340/7.36 |
| 5,881,299 A | 3/1999 | Nomura et al. ........ 395/750.06 |
| 5,898,384 A | * 4/1999 | Alt et al. ................. 340/825.36 |
| 5,925,128 A | * 7/1999 | Harmon ....................... 713/200 |
| 5,978,923 A | * 11/1999 | Kou ............................ 713/323 |
| 5,991,886 A | 11/1999 | Axenfeld ..................... 713/300 |
| 6,205,318 B1 | * 3/2001 | Schindler et al. .......... 455/3.06 |

OTHER PUBLICATIONS

No Author, "Motorola First To Offer Universal RKE Solution,"Updated Sep. 26, 1999, Release Sep. 27, 1999, Retrieved May 29, 2001. Retrieved from the Internet: http://www.mot–sps.com/news_center/press_releases/PR990927A.html>.

No Author, "Motorola Introduces 8–bit Microcontroller Designed for the Automotive Remote Keyless Entry Marketplace," Release Apr. 15, 1997, Retrieved May 29, 2001. Retrieved from the Internet: http://www.apspg.com/press/68hc805k.html>.

No Author, "Remote Keyless Entry Block Diagram," Retrieved on May 29, 2001. Retrieved from the Internet: http://www.mot–sps.com/automotive/keyless1.html.

* cited by examiner

Primary Examiner—Edward F. Urban
Assistant Examiner—Simon Nguyen
(74) Attorney, Agent, or Firm—Kenneth J. Cool

(57) ABSTRACT

A portable computer or a similar electronic device having a wireless data communication device such as a Bluetooth transceiver is provided with a power down procedure activated by a remote control device. For example, a single key remote control device emits a radio frequency signal bearing a power down control signal that is transmitted to the portable computer. The control signal is received by a receiver separate from the wireless communication device and initiates a power down process that first causes the portable computer to wake up from a sleep state, if the computer is in a sleep or similar state. The communication device or the computer then invokes a driver that either directly initiates a power down sequence or that invokes another program that initiates a power down sequence. A log file is written during power down that indicates the state of the computer at the time that the power down control signal was received.

15 Claims, 1 Drawing Sheet

APPARATUS AND METHOD FOR REMOTELY POWERING-DOWN A WIRELESS TRANSCEIVER

RELATED APPLICATION

This application claims the benefit of U.S. provisional patent application Serial No. 60/182,161, filed Feb. 14, 2000, which application is hereby incorporated by reference in its entirety.

BACKGROUND OF THE INVENTION

1. Field of the Invention

The present invention relates to the remote control of a computer or other electronic device using remote control signals broadcast to a wireless transceiver or communication port of the computer or other electronic device.

2. Description of the Related Art

Travelers who fly frequently are accustomed to the ritual of turning off and stowing notebook or other portable computers during airplane takeoff and landing. Airlines require that computers and other types of electronic devices be turned off for periods around takeoff and landing to ensure that electromagnetic radiation from these devices does not interfere with the airplane's navigation and communications systems. Turning off, packing and stowing computers in overhead bin storage is cumbersome and time consuming, sometimes leading to delays in takeoff or allowing computers to remain operating undesirably long into the landing process.

U.S. Pat. No. 5,815,407 to Huffman, et al. (the Huffman patent), entitled "Method and Device for Inhibiting the Operation of an Electronic Device During Take-Off and Landing of an Aircraft" proposes a solution to this problem for electronic books. Two implementations are described. The first of these provides in each electronic book a lateral accelerometer coupled to a thresholding circuit that identifies when the electronic book is experiencing the sort of acceleration associated with the takeoff or landing of an airplane. According to the Huffman patent, detection of a sufficient acceleration causes the electronic book to enter a power down sequence. The accelerometer-based system of the Huffman patent has a number of limitations including, for example, the orientation sensitivity of the accelerometer. The threshold acceleration at which the power down sequence commences is determined in part by the orientation of the book with respect to the direction of takeoff or landing acceleration. As such, the initiation of the shutdown sequence will be somewhat unpredictable. This directional sensitivity makes the accelerometer-based system difficult to calibrate accurately to achieve a safe but unobtrusive shut down procedure.

A second implementation described in the Huffman patent provides the electronic book with a receiver coupled to a controller capable of shutting down the electronic book in response to a signal received at the receiver. A transmitter provided in the cabin of the airplane broadcasts a signal to the receivers of the electronic books when power down of electronic books is desired, for example, during takeoff and landing of the airplane. This system has certain disadvantages, as well. The airplane cabin's broadcasting transmitter is in a fixed position and uses a particular signal to turn off all of the electronic books on the plane. Because of this, only one signal or set of signals will shut down all of the computers at once. Such a mass shut down procedure can be unacceptable to passengers who may have important subject matter active on their computer at the time the shut down signal is transmitted. It may instead be desirable to provide a system having a transmitter capable of being carried in a convenient manner that generates a signal associated with a particular person's computer. This would allow individual control of the shutdown process thereby allowing a person to initiate the shutdown process at a convenient time. Moreover, providing such individual control would allow the shutdown system to be used in environments other than the airplane.

The shutdown sequence described for these aspects of the Huffman patent is especially adapted for the electronic book and its dedicated operating system. Such a dedicated system is not well suited for a more typical computer system with a general-purpose operating system and more complex sets of peripherals and operating software.

SUMMARY OF THE PREFERRED EMBODIMENTS

According to one aspect, the present invention provides a method of powering down an electronic device incorporating a wireless communication device. The electronic device receives a power down message transmitted from a remote control device and initiates a power down procedure in response to the power down message. The power down procedure shuts down an application program associated with the wireless communication device attached to the electronic device as part of the power down procedure. The method continues by powering down the wireless communication device after shutting down the application program and powering down the electronic device after powering down the wireless communication device.

Another aspect of the invention provides a method of powering down a portable computing device having a wireless communication device. The method includes receiving a power down message transmitted from a remote control device with a receiver distinct from the wireless communication device, the receiver associate with the portable computing device and matched to a transmitter used to transmit the power down message. The portable computing device initiates a power down procedure in response to the power down message, which power down procedure references a log file within the portable computing device. The power down procedure shuts down an application program associated with the wireless communication device as part of the power down procedure. The log file is checked to determine if the wireless communication device has been powered down. The power down procedure continues by powering down the wireless communication device after checking the log file and shutting down the application program. The log file is updated to reflect that the wireless communication device has been powered down. The receiver is powered down after powering down the wireless communication device and the portable computing device is powered down after the receiver.

BRIEF DESCRIPTION OF THE DRAWINGS

The embodiments and advantages of the present invention can be better understood in conjunction with the various drawings, which form a part of the disclosure of the present invention.

DETAILED DESCRIPTION OF THE PREFERRED EMBODIMENTS

Figure 1:
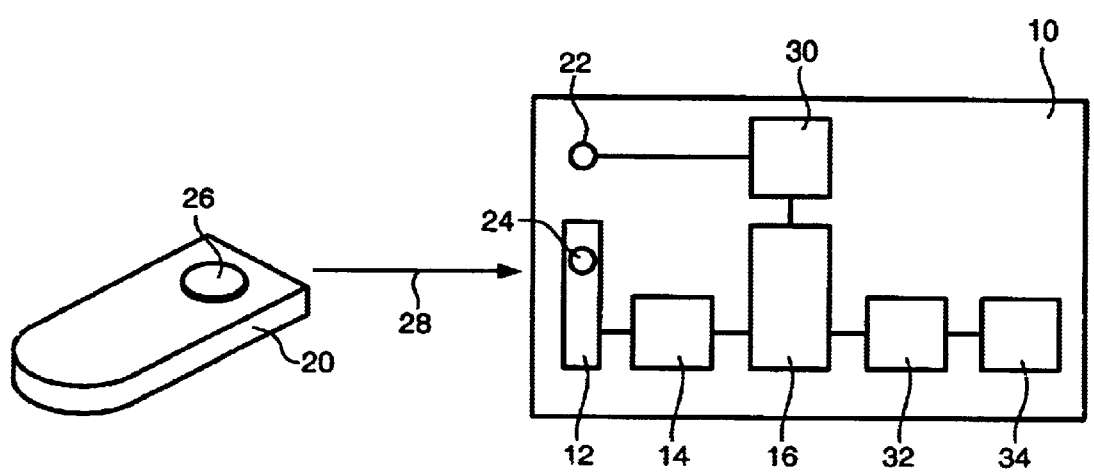
FIG. 1 illustrates schematically certain aspects of architecture for a preferred implementation of the present invention.

According to particularly preferred embodiments of the present invention, a portable computer or a similar electronic device having a wireless data communication device is provided with a power down apparatus or process activated by a remote control device. For example, a single key remote control device might emit a signal bearing a power down control message that is received by a remote control receiver on the portable computer. Most preferably, a dedicated remote control receiver distinct from the wireless communication device of the portable computer receives the power down control message. An appropriate remote control transmitter and receiver might use a remote keyless entry architecture of the type that presently transmits and receives control messages encoded within a radio frequency signal. The control message preferably is received and decoded by the receiver, which causes the portable computer to wake up from a sleep state, if the computer is in a suspend, sleep or similar state. The communication device or the computer then invokes a driver that either directly initiates a power down sequence or that causes another program to initiate a power down sequence. A log file is written during power down that indicates the state of the computer at the time that the power down control message was received. This log file facilitates power up of the computer in the same state in which the power down sequence was initiated.

Preferred embodiments of the present invention are believed to have particular utility with computers having wireless data communication capability. Portable computers and handheld computing devices can be provided with wireless data communication capability using a variety of different technologies. For example, cellular telephones may communicate data by connecting through a cellular modem to the Internet. Portable computers might communicate with wireless local area or wide area networks using a modem or transceiver operating in accordance with the Bluetooth protocol, a recognized standard for such types of wireless transceivers and communication. Bluetooth devices are presently commercially available and are expected to become pervasive in the future. Portable computing devices equipped with Bluetooth transceivers or similar wireless transceivers can receive data constantly, allowing a user to receive data such as e-mail at any time. It is to be expected that portable computer devices with wireless connectivity will be left on a greater proportion of time than present portable computer devices.

A portable computer provided with wireless data connectivity through a Bluetooth device may have a sleep state in which many of the capabilities of the computer are powered down, awaiting a signal or change of state before powering up. A Bluetooth device attached to a computer in a sleep state may periodically activate or wake up from the device's sleep state and poll for a connection, that is the Bluetooth device transmits a request for a network connection or network recognition. Thus, while it is likely that a computer with a Bluetooth device is more likely to be left on at least in a sleep state, that sleep state is one that might include periodic transmissions from the Bluetooth device. Because of this, many airlines will require that a passenger's portable computer be fully powered down for take off and landing, rather than simply inactive in a sleep state. The problems associated with retrieving personal computers from overhead bin storage, turning off the computer and stowing the computer for takeoff and landing can be expected to increase.

Preferred embodiments of the present invention are expected to address this growing problem by providing a mechanism and process whereby computers or like devices with wireless transceivers within the overhead bin storage of an airplane can be remotely shut down in a convenient manner that provides safety and data integrity for the portable computer. These embodiments are expected to reduce certain of the problems associated with personal computers during airplane takeoff and landing. Embodiments of the present invention might also be useful in environments other than airplanes, and may have utility for devices other than personal computers and handheld computing devices. These and other presently preferred implementations of the present invention are now described in greater detail with reference to the figures.

FIG. 1 provides an overview of a power down system in accordance with the present invention. A computer or similar electronic device 10 has wireless communication capability through, for example, a Bluetooth modem or transceiver 12. For convenience, discussion of the invention is made in terms of a portable computer, but those of skill in the art will appreciate that this discussion is exemplary in that other electronic devices having wireless communication capability may also benefit from application of the technology described here. Embodiments of the present invention are particularly preferred for devices having wireless communication devices of the type that automatically initiate wireless communication sessions to determine if a network is available for connection or if data are available for delivery to the device. Similarly, while Bluetooth devices are identified as a particularly preferred characteristic of systems in accordance with the present invention, transceivers that operate in accordance with other communication protocols might also be used. For example, transceivers operating in accordance with the IEEE 802.11 (wireless Ethernet), HiperLAN, CDMA, W-CDMA CDMA or other wireless communication protocols might also be used in accordance with aspects of the present invention.

The illustrated Bluetooth device 12, or similar transceiver, operates in accordance with the recognized, but still informal, Bluetooth standard. Such devices and chipsets for implementing such devices are commercially available. During normal operation, the Bluetooth device operates in conjunction with device driver software 14 that provides an interface between the operating system 16 of the portable computer 10. During normal, full power and full function operation of the portable computer 10, the wireless transceiver 12 may be in substantially constant communication with a wireless network or another Bluetooth device. In such a mode of operation, messages are exchanged on a substantially constant basis between the wireless transceiver 12 and the operating system 16. By contrast, when the portable computer is in it's suspend or sleep state, there will be little communication between the wireless transceiver 12 and the operating system of the computer.

Regardless of the state of the personal computer, a remote control device 20 such as that illustrated in FIG. 1 preferably initiates a power down sequence in accordance with the present invention. Presently preferred implementations of the power down system in accordance with the present invention use a low cost remote control device that is capable of passing control signals to a target device without direct line of sight access to the target device. For example, preferred implementations of suitable remote control devices may use transmit messages using radio frequency signals of the type known to readily penetrate through furniture or the typical plastic and other materials used to build storage bins in airplanes. In the presently contemplated embodiments, the remote control device 20 is a substantially dedicated device and might be chosen to function only for initiating power down of the computer system.

A particularly useful technology for the remote control of the present invention is the remote keyless entry (RKE)

technology that is in widespread use within the automotive industry. Combinations of RKE transmitters and receivers are readily available, with both transmitters and receivers being compact and inexpensive. For example, Motorola presently sells an RKE controller with embedded RF capabilities designated by 68HC908RFK2, as well as a variety of different complimentary transmitters and receivers. Most preferably, the remote control transmitter is embodied in a single key remote control device 20 like that illustrated in FIG. 1. Transmitters and receivers are selected as pairs so as to use the same communication frequencies and to implement complementary protocols between the devices.

Although it would be possible for the remote control system to communicate directly with a wireless transceiver such as a Bluetooth device, presently preferred embodiments of the present invention do not utilize the wireless communication port for initiating the power down sequence. Rather, presently preferred embodiments of the present invention provide a RKE or similar receiver within the computer system or the wireless transceiver as a distinct communication channel. As illustrated in FIG. 1, it is possible for the remote control receiver 22 to be physically located within the portable computer and might, for example, be located on the motherboard of the personal computer. Alternately, the receiver 24 for the remote control system might be positioned within the peripheral device 12 that includes the wireless transceiver. For example, if wireless communication is conducted through a Bluetooth modem on a PC Card or a PCMCIA card, then the receiver for the remote control system might be provided on the circuit board that carries the Bluetooth circuits.

In operation, a user that wishes to cause a portable computer to initiate a power down sequence depresses the key 26 on the remote control device 20. The remote control device 20 generates and transmits a remote control signal 28 that carries a power down message. The signal 28 is detected by the receiver 22, 24 within the target computer system. On receipt and decoding of the power down message, the remote control receiver 22, 24 initiates a communication sequence to communicate with the operating system 16 of the portable computer 10 or other like-controlled electronic device.

A received and decoded power down message is communicated through the system bus of the target computer or electronic device to the operating system of the computer or electronic device. This might be accomplished in any number of known ways. The receiver 22, 24 may invoke a software process or device that in turn communicates an interrupt to the system bus of the target computer 10. This software process 30 may exist and function within the microcontroller of the remote control receiver. Alternately, the interrupt might be generated within the controller of the wireless transceiver, with the driver 14 for the wireless transceiver 12 including a function for generating the power down interrupt. Regardless of its manner of generation, the power down interrupt is provided over the system bus of the computer 10 to the operating system 16. The operating system then invokes a software driver 32 that initiates the shut down process.

The remote control receiver may, for example, interface to the operating system of the computer in the same manner as a modem. When the receiver detects a valid power down message, the receiver initiates the interrupt generation process using the modem "ring signal" input. This protocol allows the computer 10 to wakeup using the "wake-on-ring" facility provided by the Microsoft Windows operating system. Using this facility of the commonly used Windows operating system makes it easy to implement the power down procedure and also makes it easy to test the procedure.

When the computer operating system 16 receives the modem "wake-on-ring" interrupt, the operating system wakes the computer from sleep mode to the active mode, if the computer is not already in the active mode. The interrupt causes the operating system to invoke a device driver 32, which first investigates the source of the interrupt. If the interrupt was not generated in response to the wireless power down facility, the driver 32 causes the alternative action to be taken, generally by invoking a different such as a modem driver to process an incoming modem connection.

If, on the other hand, the interrupt was generated in response to the receipt and decoding of a power down message, the driver 32 invokes an application program 34 that conducts the power down of the computer. This power down program 34 may proceed by first closing all applications associated with or attached to any wireless peripherals installed on the computer, including the Bluetooth transceiver 12 illustrated in FIG. 1. The power down program 34 then issues power down commands to all of the wireless peripherals attached to the computer 10. At this point in the power down process, the power down program 34 preferably writes a log file that notes the time, date, identifies the application programs terminated in the power down process and sets appropriate flags. The log file may be stored in flash memory, on hard disk, or in other non-volatile memory so that the log file will reliably be available for the computer during the next wake up or power up sequence. Following writing of the log file, the application program powers down the remote control receiver 22 or 24 and initiates the Windows power down procedure to shut down the computer 10 itself.

When the computer is reawakened or powered back up, the boot sequence preferably reviews the log file and advises the user that wireless peripherals were powered down and offers the user the option of re-enabling such wireless devices and their associated application programs. In particularly preferred embodiments, a user can configure the power down program 34 to elect a re-enable mode in which the computer is awakened or powered up into the state of the computer in which power down was initiated. According to this preferred embodiment, a flag is set within the log file indicating that the computer is to be brought back into the state at the time of power down. Thus, when the boot sequence examines the log file, the flag is interpreted and causes the boot sequence to activate the previously powered-down wireless peripheral devices and their associated application programs. After the devices are reactivated, the power down program 34 returns the computer to its previous state, whether that was the active state or in a sleep, suspend or hibernate state.

The log file is preferably used in an additional manner in powering down the computer. Preferably, during power down the power down program 34 keeps track in the log file of the programs and devices as they power down. The power down program 34 checks the log file to determine whether any particular device has been powered down before instructing that device to power down. This prevents the power down program from repeatedly attempting to power down devices in response to repeated power down messages generated by repeated keying of the remote control device 20.

In particularly preferred embodiments, the remote control device uses a rolling code generator to ensure unique codes between the transmitter and the receiver pairs. Such rolling code generation is an available feature of remote keyless entry systems and so is easily implemented in the present system. In certain embodiments, an additional "universal code" is implemented in the receivers. A universal code would be an additional code that could be received by a remote control receiver to initiate a power down sequence. Such a universal code would allow a flight attendant to use a universal transmitter to send shut down all of the various computers having wireless transceivers on a given airplane at once. The universal code would not change on a regular basis. Most preferably, the universal code transmitters are provided in limited distribution, for example only being sold to airlines to limit the mischief that might be done by an unauthorized party with a universal code transmitter. Universal code transmitters and receivers are not presently available, but can be obtained by modifying the presently available RKE systems.

Most preferably the remote control transmitter 20 is dedicated to the power down system and process of the present invention. Other variations are, of course, possible. In addition, it is preferred that the power down sequence instituted by the remote control device initiates only a shut down activity. This ensures that accidental multiple depressions of the key of the remote control device does not leave the computer in an undesired on state or in an intermediate state.

In the embodiment discussed above, the remote control receiver is provided on the motherboard of the computer 10 or within the wireless transceiver device 12. Other arrangements are possible. For example the remote control receiver could be provided as a printed circuit board coupled to the bus of the computer motherboard as a "mini-PCI" device. The remote control receiver might also be provided as a PC-Card or PCMCIA card for devices that use such devices or as a device attached to any of the ports of the computer 10 including, for example, the serial port of the USB port.

While aspects and certain advantages of the present invention have been described herein with reference to certain preferred embodiments of the present invention, it should be appreciated that the present invention is not limited to the particular embodiments thereof. Those of ordinary skill in the art will appreciate that modifications and variations on the basic teachings of the present invention might be made without varying from the fundamental teachings thereof. Consequently, the scope of the present invention is to be determined from the claims, which follow.

What is claimed:

1. A method of powering down an electronic device having a wireless communication device, the method comprising:
   receiving with the electronic device a power down message transmitted from a remote control device, the electronic device initiating a power down procedure in response to the power down message;
   shutting down an application program associated with the wireless communication device attached to the electronic device as part of the power down procedure;
   powering down the wireless communication device after shutting down the application program; and
   powering down the electronic device after powering down the wireless communication device.

2. The method of claim 1, wherein the electronic device is a portable computing device and the wireless communication device is a wireless modem.

3. The method of claim 2, wherein the wireless communication device operates in accordance with a Bluetooth protocol.

4. The method of claim 1, wherein the power down message is encoded within an RF signal.

5. The method of claim 1, wherein the electronic device receives the power down message with a receiver distinct from the wireless communication device, the receiver matched to a transmitter used to transmit the power down message.

6. The method of claim 5, wherein the receiver is powered down after the wireless communication device and before the electronic device is powered down.

7. The method of claim 4, wherein the electronic device receives the power down message with a receiver distinct from the wireless communication device, the receiver matched to a transmitter used to transmit the power down message.

8. The method of claim 7, wherein the receiver is powered down after the wireless communication device and before the electronic device is powered down.

9. The method of claim 8, wherein the power down procedure references a log file before attempting to power down the wireless communication device and does not attempt to power down the wireless communication device if the log file indicates that the wireless communication device is powered down.

10. The method of claim 1, wherein the power down procedure references a log file before attempting to power down the wireless communication device and does not attempt to power down the wireless communication device if the log file indicates that the wireless communication device is powered down.

11. The method of claim 1, wherein the electronic device has a sleep mode and the electronic device is powered up from the sleep mode at an initial stage of the power down procedure.

12. A method of powering down a portable computing device having a wireless communication device, the method comprising:
   receiving a power down message transmitted from a remote control device with a receiver distinct from the wireless communication device, the receiver associate with the portable computing device and matched to a transmitter used to transmit the power down message, the portable computing device initiating a power down procedure in response to the power down message, the power down procedure referencing a log file within the portable computing device;
   shutting down an application program associated with the wireless communication device as part of the power down procedure;
   checking the log file to determine if the wireless communication device has been powered down;
   powering down the wireless communication device after checking the log file and shutting down the application program;
   updating the log file to reflect that the wireless communication device has been powered down;
   powering down the receiver after powering down the wireless communication device; and
   powering down the portable computing device after powering down the receiver.

13. The method of claim 12, wherein the electronic device has a sleep mode and the electronic device is powered up from the sleep mode at an initial stage of the power down procedure.

14. The method of claim 12, wherein the wireless communication device operates in accordance with a Bluetooth protocol.

15. The method of claim 12, wherein the power down message is encoded within an RF signal from the transmitter.

* * * * *